United States Patent [19]
Arndt et al.

[11] 3,740,454
[45] June 19, 1973

[54] CONTROLLED BUOYANCY ELECTRICAL STRAND

[75] Inventors: Rudolph P. Arndt; William W. Ulmer; Daniel G. Stone, all of Muskegon, Mich.

[73] Assignee: The Anaconda Company, New York, N.Y.

[22] Filed: Jan. 6, 1972

[21] Appl. No.: 215,858

[52] U.S. Cl. ........ 174/101.5, 174/110 F, 174/113 R
[51] Int. Cl. ............................................. H01b 7/12
[58] Field of Search .................... 174/70 R, 101.5, 174/113 R, 110 F, 115

[56] References Cited
UNITED STATES PATENTS
3,272,910   9/1966   Flint ............................... 174/101.5
3,517,110   6/1970   Morgan ........................ 174/101.5 X

OTHER PUBLICATIONS

"Tiny Spheres From FXYASH Find Market" in Electrical World, June 1, 1971, p. 62.

"ECCOSYN" Ad. Brochure of Emerson & Cuming Inc., Oct. 23, 1968.

Primary Examiner—E. A. Goldberg
Attorney—Victor F. Volk

[57] ABSTRACT

A fine expendable wire strand with a slow, predetermined sinking rate in sea water is formed of enamel-film insulated conductors covered, along with a tensile strand, by a polymeric foam, interspersed with glass bubbles.

11 Claims, 2 Drawing Figures

3,740,454

CONTROLLED BUOYANCY ELECTRICAL STRAND

BACKGROUND OF THE INVENTION

The present invention is directed to an improved wire strand or fine cable of the type that is deposited in long lengths from a moving vessel for the purpose of making measurements of the environment at sea. It is desired of such strand that it should have the smallest possible diameter, consistant with adequate tensile strength and it should be very rapidly depositable, while at the same time retaining such electrical properties as good conductance, high insulation resistance between conductors and between the conductors and sea water, and low capacitance between conductors and the conductors and sea water. It would be desirable that the strand not sink too rapidly upon being deposited in the sea, but, on the other hand, it should sink to the bottom within a reasonable time and not remain floating after it has been discarded. It should be possible to manufacture the strand on available wire insulating equipment, in large quantities, at reasonable cost.

SUMMARY

We have invented a controlled buoyancy strand which satisfies the hitherto unobtainable combination of desiderata comprising at least one, and preferably, in parallel, two, or more, elongated electrical conductors, such as copper wires, insulated with enamel film, such as polyurethane film. Our strand preferably also comprises at least one tensile member, parallel to the conductors. Buoyancy is supplied to our strand by an element, such, preferably as an elongated encasement, comprising a polymeric foam and at least 4 weight percent and, preferably, no greater than 20 weight percent of glass bubbles dispersed in the foam. Preferably our encasement will have a circular section, will have a diameter no greater than 0.04 inches, and will have a composite density only slightly exceeding the density of sea water. We have found plasticized polyvinyl chloride is particularly suitable for the foam of our strand and that the glass bubbles may advantageously have an average particle density that does not exceed about 0.35 grams per cubic centimeter.

In our new method of making a controlled buoyancy strand we film-coat at least one electrical conductor wire with magnet wire enamel. We blend a mixture comprising 75–96 parts by weight of a polymeric organosol, 4–25 parts by weight of glass bubbles, and 0.1–2.0 parts by weight of blowing agent. We continuously pass the conductor, coated with the enamel, along with at least one tensile member, through an enameling applicator and therein cover the member and the wire with a layer of the mixture. Then we pass the strand through a heating zone, therein activating the blowing agent and forming the organosol. Preferably several applications of the mixture will be applied, followed each time by passage through the heating zone. We may also apply coatings of the polyvinyl organosol free from blowing agent but comprising the dispersion of glass bubbles, preferably before and after the application of organosol and glass bubbles comprising blowing agent.

DETAILED DESCRIPTION OF PREFERRED EMBODIMENT

Figure 1:
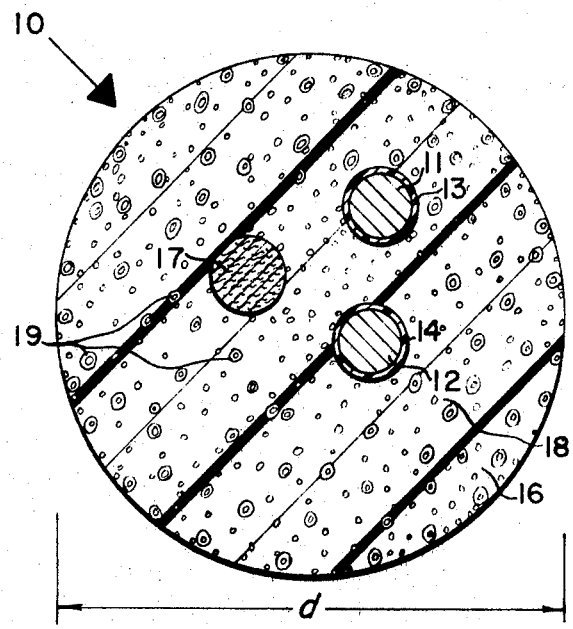
FIG. 1 shows a section of a strand of our invention.
Figure 2:
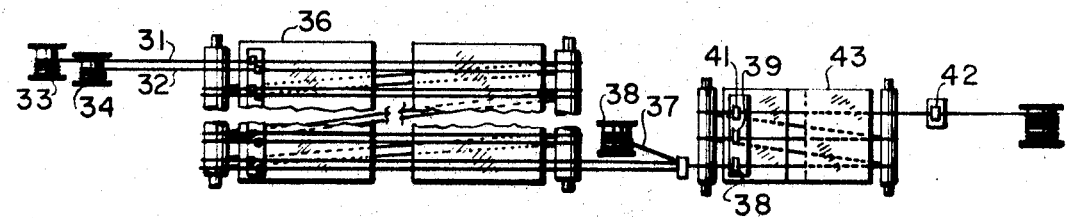
FIG. 2 shows a plan of the steps of the method of our invention.

A two conductor embodiment of our strand is indicated generally by the numeral 10 of FIG. 1. Two fine copper wires 11, 12 are insulated respectively with films 13, 14 of polyurethane enamel. We have preferred the use of polyurethane because it bonds particularly well to a polyvinyl encasement 16, but other enamels, known as magnet wire enamels such as polyvinyl formal, polyester, polyimide-amide, polyimide, epoxy, nylon, polyacrylic and polyolefin are well suited for use in our invention. The thickness of the enamel films 13, 14 will be no greater than that required for a desired degree of insulation resistance, since the film, being non-porous and solid in section, will have a higher density than the encasement 16. Typical thickness of the films 13, 14 in the illustrated embodiment will approximate 0.1 mil on Awg 39 (0.0035 inch) wire.

The wires 11, 12 are laid parallel in the strand 10. This has the advantages that no wire twisting step is required with attendant expense and possible damage, particularly to such fine wire, that the capacitance can be lowered by separating the two wires, and that no problem is presented of uniform distribution of the encasement 16 into interstices of a twisted strand. Voids at the interstices of twisted wires would result in undesirable variations of density. Where these advantages are relatively unimportant, however, which may be the case with larger conductors, twisted wires may be used within the scope of our invention. A tensile member 17 is laid parallel to the wires 11, 12 to prevent them from elongating due to the stresses of dereeling, and of any water drag that may occur. We prefer to use a cotton-polyester thread having a breaking strength in excess of 2 pounds for the member 17. Other fibers such as pure cotton or polyester, rayon, linen, and silk may be used as may also glass or metals such as stainless steel, but these latter have the disadvantage that increased encasement volume is required to compensate for their weight and the steel would detract from electrical properties.

The novel structure of the encasement 16 constitutes an essential feature of our invention. This comprises a polymeric foam portion 18 within which are dispersed a large plurality of very small glass bubbles 19. Organosols suitable for the portion 18 are commercially available. An organosol is described in the Condensed Chemical Dictionary published by Reinhold Publishing Corporation as "a colloidal dispersion of any insoluble material in an organic liquid, but more specifically, the finely divided dispersion of a synthetic resin in plasticizer, with or without solvents or other materials." "Organosol" in this application refers to the more specific definition. The organosol of foam 18 is polyvinyl chloride and it is made to foam by the inclusion of a blowing agent, of which a number of types are commercially available. We have preferred to use N,N dinitroso-N,N-dimethyl terephthalamide because of the fine structure of the foam created and its low release temperature (90°–105° C). It is important that the blowing agent selected should produce a closed cell structure. The polymeric foam would, in itself, be capable of imparting buoyancy to the strand 10 but we have discovered that the dispersion of glass bubbles within the foam structure not only enables us to control the strand density within fine limits, but unexpectedly results in a much smoother strand surface. Smoothness is important to strand handling both in production operations and deposition at sea.

By glass bubbles we refer herein to very small hollow glass spheres such as those sold as Micro balloons IC 101 by Emerson & Cuming Inc., Canton, Mass., and sold as glass bubbles by the 3M Company of St. Paul, Minn. Glass bubbles are available in nominal average densities from 0.20 to 0.37 grams per cubic centimeter. The higher densities are due to greater glass wall thicknesses that may be required to withstand high pressures. We have employed glass bubbles of 0.20 grams per cubic centimeter average density and prefer to keep the density to 0.35 grams per cubic centimeter for reasons of economy and lower strand diameter. We have found that glass bubbles passing through a 170 inch screen should be used in the encasement 16 and that about 8 percent by weight of the bubbles based on the weight of foam is optimum. Fewer than 4 percent will not suffice to afford the advantages of glass bubble addition and higher percentages, such as, in particular, percentages over 20 are not properly supported in a foam matrix.

The strand 10 has no outer jacket and the encasement 16 is in direct contact with sea water after the strand has been deposited possibly except for a very thin surface wiped coating of silicone oil lubricant such as Dow Corning 510 Silicone. By this means the diameter "$d$" is minimised and the eventual collapse of the foam, once the strand has sunk to sufficient depths, removes any chance of resurfacing.

EXAMPLE

| | I | II | III | IV |
|---|---|---|---|---|
| Organosol | PVC | PVC | PVC | PVC |
| % glass | 13 | abt. 7 | 5.5–8 | 10 |
| glass density, g/cc | 0.33 | 0.28 | 0.20 | 0.20 |
| tensile member | none | cotton-nylon | cotton-polyester | glass |
| conductor size AWG | 39 | 39 | 39 | 39 |
| No. of conductors | 2 | 2 | 2 | 2 |
| conductor insulation | epoxy nylon* | poly-urethane | poly-urethane | poly-ure-thane |
| No. of coats of organosol | 5 | 4 | 3 | 3 |
| strand O.D., inch | 0.036 | .036 | .032 | .035 |
| breaking load, lbs. | 0.45 | 2.6 | 2.7 | 6.8 |
| copper elongation, % | 27 | 6.5–11 | 6–19 | 5.6 |
| sinking rate, in salt water** | | | | |
| initially, ft/min | 0.4 | 0.4 | 1.0 | 0.9 |
| 24 hrs. ft/min | 3.4 | 3.0 | 0.5 | 0.9 |
| IR wire to wire 20 ft. samples, thousand megohm in air | 200 | 35 | 200+ | 200+ |
| salt water** initial | 30 | 35 | 200 | 200 |
| " 8 hrs | 10 | 2.5 | 10 | 15–20 |
| " 72 hrs | 10 | 0.3 | 10 | 15–20 |
| capacitance/ft at 1 KHz pf, wire to wire in air | 49.2 | 41.0 | 28.5 | 17.7 |
| | 57.8 | 54.8 | 36.5 | 26.3 |
| Diss. factor, wire to wire at 1 KHz, 1 ft., | | | | |
| % in air | 12.6 | 16.3 | 10.1 | 9.2 |
| in salt water** | 12.7 | 15.3 | 6.7 | 7.5 |

* described in U.S Pat. No. 3,408,867
** Na Cl in water, sp. gr. 1.027 at 25°C

METHOD OF MANUFACTURE

The preferred method of manufacturing the strand of our invention is well illustrated by the method used for the strand of EXAMPLE III, above. A composition "A" was prepared by screening B 22A glass bubbles, supplied by 3M Company and discarding all bubbles that were retained on a standard 170 mesh screen. A mixture was then prepared of a polyvinyl chloride organosol having a viscosity of 1,900–1,950 cps at 20° C, a Shore Durometer hardness (after cure) of D 49, a cured tensile strength at 25° C of 2,250 psi and an elongation of 227 percent; and 8 percent of the weight of the organosol of the separated fine glass bubbles. Composition "B" was prepared, as above, but with 7.9 percent of glass bubbles and 0.7 percent of blowing agent (Nitrosan, supplied by E. I. du Pont de Nemours and Co., Inc., Wilmington, Del.). Composition C was prepared, identical to composition A but with 5.5 percent of the bubbles. Two Awg No. 39 copper wires 31, 32 insulated with polyurethane film by paying them from spools 33, 34 through a known type of enamelling machine 36, (commercial standard Single Analac Wire supplied by Anaconda Wire and Cable Co.), and a thread of Polyspun 100 37 supplied by the Standard Coosa-Thatcher Co. of Chattanooga, Tenn., from a spool 38, were pulled in parallel through an 0.028 inch steel ball enamelling die, 38 and coated with composition A to a diameter of 0.020 inch, after curing. The strand was then passed through an 0.034 inch ball die 39 and coated with composition B to a cured diameter of 0.028 inch after curing, finally the strand was passed through an 0.036 ball die 41 and coated with composition C to a diameter of 0.032 inch and, after curing, wiped with silicone oil by means of felt applicator 42 (DC–510 supplied by Dow Corning Corp. of Midland, Mich.). Coating speed was 30 feet per minute and after each coat the strand passed through a 5-foot horizontal muffle oven 43 maintained at 210° C for the first two feet and 230° C for the last 3 feet of oven space. A cured specimen taken after the first coat exhibited a descent rate of 7.5 feet per minute in the 1.027 gravity salt water. A specimen after the second coat exhibited a descent rate of 2.4 feet per minute.

The foregoing description has been exemplary rather than definitive of our invention for which we desire an award of Letters Patent as defined in the following claims.

We claim:

1. A controlled buoyancy strand comprising:
   A. at least one elongated insulated electrical conductor,
   B. a buoyant element supporting said conductor, comprising:
      a. a polymeric foam,
      b. at least four percent of weight of said foam of glass bubbles dispersed in said foam.

2. A controlled buoyancy strand comprising:
   A. at least one elongated electrical conductor,
   B. a wall of enamel film insulation surrounding said conductor,
   C. a tensile member extending parallel to said conductor,
   D. an elongated encasement of polymeric foam surrounding said conductor and said member,
   E. 4–20 percent of the weight of said foam of galss bubbles dispersed in said foam.

3. The strand of claim 2 comprising two, in parallel, of said conductors.

4. The strand of claim 2 wherein said encasement is circular in section.

5. The strand of claim 4 having a diameter no greater than 0.04 inch.

6. The strand of claim 2 having a composite density only slightly exceeding the density of sea water.

7. The strand of claim 2 wherein said enamel film comprises polyurethane.

8. The strand of claim 2 wherein said conductor comprises copper.

9. The strand of claim 2 wherein said foam comprises polyvinyl chloride.

10. The strand of claim 2 wherein the average particle density of said glass bubbles does not exceed about 0.35 grams per cubic centimeter.

11. A slow-sinking cable having a diameter no greater than about 0.04 inches comprising:
  A. two parallel copper wires,
  B. an electrically insulating film of polyurethane surrounding each of said wires,
  C. a textile tensile member extending parallel to said wires,
  D. a plasticized polyvinyl chloride encasement surrounding said wires and said member,
  E. 4–20 percent by weight of said plasticized polyvinyl chloride of glass bubbles dispersed in said polyvinyl chloride.

* * * * *